United States Patent [19]

Smolka et al.

[11] 4,201,689
[45] May 6, 1980

[54] PROCESS FOR THE PRODUCTION OF TENSIDE-CONTAINING CATION EXCHANGER ALUMINOSILICATES

[75] Inventors: Heinz G. Smolka, Langenfeld; Klaus Schumann, Erkrath, both of Fed. Rep. of Germany

[73] Assignees: Henkel Kommanditgesellschaft auf Aktien, Dusseldorf-Holthausen; Deutsche Gold- und Silber-Scheideanstalt vormals Roessler, Frankfurt am Main, both of Fed. Rep. of Germany

[21] Appl. No.: 913,587

[22] Filed: Jun. 8, 1978

[30] Foreign Application Priority Data

Jun. 18, 1977 [DE] Fed. Rep. of Germany ....... 2727475

[51] Int. Cl.$^2$ ................ C01B 33/26; C01B 33/28
[52] U.S. Cl. .................................. 252/184; 210/384; 252/179; 252/313 S; 423/328; 423/329
[58] Field of Search .................... 252/184, 179, 313 S, 252/357; 210/38 A; 423/328, 329

[56] References Cited

U.S. PATENT DOCUMENTS 4,126,574  11/1978  Reinwald et al. .................... 252/179

Primary Examiner—Benjamin R. Padgett
Assistant Examiner—Irwin Gluck
Attorney, Agent, or Firm—Hammond & Littell, Weissenberger & Muserlian

[57] ABSTRACT

An improved process for the production of tenside-containing aluminosilicates having cation exchange capacity by precipitating the same from aqueous solutions of alkali metal silicates and alkali metal aluminates in the presence of ionic surface-active compounds from the group consisting of anionic surface-active compounds, cationic surface-active compounds and zwitterionic surface-active compounds, wherein the excess alkalinity is neutralized by conducting said process in the presence of an acid aluminum salt such as aluminum sulfate, aluminum nitrate and aluminum chloride.

17 Claims, No Drawings

PROCESS FOR THE PRODUCTION OF TENSIDE-CONTAINING CATION EXCHANGER ALUMINOSILICATES

BACKGROUND OF THE INVENTION

A process for the preparation of aluminosilicates in which surface-active compounds or tensides, which are resistant to the hardness of water are contained in a bound form therein has been disclosed in German Published Application (DOS) No. 2,439,572. A corresponding U.S. application was filed as Ser. No. 811,964, on June 6, 1977, now U.S. Pat. No. 4,126,574. The products are obtained by precipitation resulting from the reaction of water-soluble silicates with water-soluble aluminates in the presence of water and surfactants. This precipitation is preferably carried out by mixing an aqueous aluminate solution with an aqueous silicate solution, the tensides preferably being present in the silicate solution.

The products of the above process are finely divided, X-ray amorphous aluminosilicates which contain tensides in a bound form as well as bound water and which, based on the tenside-free and anhydrous form, have the composition:

$$0.7\text{--}1.5\ Me_2O \cdot Al_2O_3 \cdot 0.8\text{--}6\ SiO_2,$$

wherein $Me_2O$ is preferably an alkali metal oxide, in particular $Na_2O$. The compounds have a marked calcium binding capacity, amounting to 50 to 200 mg CaO/gm of anhydrous active substance, and an exceptionally high suspension stability in water. The water content of the dried products is generally in the region of from 3 to 8 mols per mol of $Al_2O_3$ (8% to 45% by weight).

In the process according to German DOS No. 2,439,572, the preferred alkali metal aluminosilicates are obtained from alkali metal aluminates and alkali metal silicates, generally in the commercial form, which have a certain, fixed ratio of $Me_2O/Al_2O_3$ and $Me_2O/SiO_2$. If, using the given aluminate and silicate solutions, the quantities of aluminate and of silicate are calculated according to the desired $Al_2O_3/SiO_2$ ratio in the end product so that no excess aluminate or silicate is present in the mother liquor of the product, then the quantity of alkali metal in the reaction mixture can no longer be freely chosen. This means, however, that the reaction mixture for the precipitation in most cases contains more alkali metal than corresponds to the composition of the desired product. Although a high proportion of the surplus alkali used is removed with the mother liquor when the precipitation product is isolated, the remainder is left in the precipitation product and increases the alkalinity in the interior of the individual particles. It is this enclosed alkali which will hereinafter be referred to as "excess alkali."

Although excess alkali may in some cases be advantageous, for example, as a reserve of alkali when aluminosilicates are used in washing liquors, the use of aluminosilicates with excess alkali in agents which are required to have a low pH gives rise to difficulties in adjustment of the pH since it may take days or even weeks to reach a constant pH due to the delayed release of excess alkali enclosed in the particles.

Another serious disadvantage of the excess alkali is its effect on the tensides contained in the products, especially at elevated temperatures or on prolonged storage. Cationic tensides, which are sensitive to alkali, are particularly seriously affected so that the products gradually turn yellow and develop an unpleasant smell.

To overcome these and other disadvantages, the excess alkali had to be removed by washing or neutralization which requires large quantities of water and prolonged washing. In addition, such a procedure would entail the risk of removing the surfactants which are also enclosed in the particles, in which case the products would lose their special properties.

OBJECTS OF THE INVENTION

An object of the present invention is to produce an aluminosilicate containing bound water and bound and absorbed tensides which is substantially neutral and free of excess alkali.

Another object of the present invention is the development of a process for the production of a cation-exchanging water-insoluble, x-ray amorphous alkali metal aluminosilicate free of excess alkali, containing at least 3 mols of bound water for every mol of $Al_2O_3$ and from 0.01% to 50% by weight, based on the anhydrous weight, of a surface-active compound active in the presence of water hardness formers selected from the group consisting of anionic surface-active compounds, cationic surface-active compounds, nonionic surface-active compounds, and zwitterionic surface-active compounds, and having for every mol of $Al_2O_3$, a mols of $Me_2O$, where Me is an alkali metal, and b mols of $SiO_2$, wherein a represents a value of from 0.7 to 1.5 and b represents a value of from 0.8 to 6, said aluminosilicates having a calcium sequestering power of from 50 to 200 mg CaO/gm of anhydrous active substance when measured at 50° C. by the Calcium Binding Power Test Method set out in the specification and a particle size of less than $30\mu$, which comprises the steps of mixing an aqueous alkali metal silicate solution and an aqueous alkali metal aluminate solution in the presence of the desired amount of said surface-active compound active in the presence of water hardness formers, wherein the amount of said alkali metal aluminate solution provided for the precipitation reaction with said alkali metal silicate solution is partially replaced to such an extent by the solution of an acid aluminum salt selected from the group consisting of aluminum sulfate, aluminum nitrate and aluminum chloride, added as a separate solution, that the total amount of alkali metal present in the precipitation reaction mixture over and above the amount of a mols of $Me_2O$ is converted into a water-soluble neutral salt by the acidity of said aluminum salt, by using x mols of $Al^{3+}$ ions in aqueous solution in order to obtain the precipitation product containing a mols of $Me_2O$ and b mols of $SiO_2$, per 1 mol of $Al_2O_3$, when using an alkali metal silicate solution containing c mols of $Me_2O$ per b mols of $SiO_2$ and an alkali metal aluminate solution containing d mols of $Me_2O$ per 1 mol of $Al_2O_3$, and reducing the given quantity of alkali metal aluminate by (x/2) mols, the value for x being other than 0 and obtained from the equation =

$$\frac{2(c + d - a)}{3 + d},$$

wherein said surface-active compound is present before the formation of the amorphous precipitation product, converting the reaction gel to an amorphous precipitation product by stirring, separating the mother liquor and recovering said cation-exchanging, water-insoluble, x-ray amorphous, alkali metal silicate free of excess alkali.

These and other objects of the invention will become more apparent as the description thereof proceeds.

DESCRIPTION OF THE INVENTION

It has now been found that disadvantages of the prior art can be overcome if care is taken when preparing the aluminosilicates to ensure that the molar quantities of starting materials present in their various solutions are so adjusted to each other in their alkalinity that no excess alkali is present in the reaction product.

The process according to the invention for the preparation of aluminosilicates having the composition: a mol $Me_2O \cdot 1$ mol $Al_2O_3 \cdot b$ mol $SiO_2$ is characterized in that such a proportion of the quantity of alkali metal aluminate solution provided for the precipitation reaction with the alkali metal silicate solution is replaced by the solution of an acid aluminum salt taken from the group comprising aluminum sulfate, aluminum nitrate and aluminum chloride, added as separate solution, that the quantity of alkali present in the precipitation reaction mixture over and above a mol of $Me_2O$ is converted by the acid group of the aluminum salt into a water-soluble neutral salt which can be removed with the mother liquor, the hardness resistant tensides from the group comprising anionic, nonionic, cationic and zwitterionic surface-active compounds being present during the formation of the cation-exchanging, amorphous alkali metal aluminosilicate, this object being achieved by means of the fact that, in order to obtain the precipitation product containing a mol of $Me_2O$ and b mol of $SiO_2$ per 1 mol of $Al_2O_3$ when using an alkali metal silicate solution containing c mol of $Me_2O$ per b mol of $SiO_2$ and an alkali metal aluminate solution containing d mol of $Me_2O$ per 1 mol of $Al_2O_3$, x mols of $Al^{3+}$ ions are used in the form of an acid salt, in particular aluminum sulfate, in aqueous solution and the given quantity of alkali metal aluminate is reduced by (x/2) mol, the value for x being obtained from the following equation:

$$x = \frac{2(c + d - a)}{3 + d}$$

More particularly, the present invention relates to a process for the production of a cation-exchanging water-insoluble, x-ray amorphous alkali metal aluminosilicate free of excess alkali, containing at least 3 mols of bound water for every mol of $Al_2O_3$ and from 0.01% to 50% by weight, based on the anhydrous weight of a surface-active compound active in the presence of water hardness formers selected from the group consisting of anionic surface-active compounds, cationic surface-active compounds, nonionic surface-active compounds, and zwitterionic surface-active compounds, and having for every mol of $Al_2O_3$, a mols of $Me_2O$, where Me is an alkali metal, and b mols of $SiO_2$, wherein a represents a value of from 0.7 to 1.5 and b represents a value of from 0.8 to 6, said aluminosilicates having a calcium sequestering power of from 50 to 200 mg CaO/gm of anhydrous active substance when measured at 50° C. by the Calcium Binding Power Test Method set out in the specification and a particle size of less than 30μ, which comprises the steps of mixing an aqueous alkali metal silicate solution and an aqueous alkali metal aluminate solution in the presence of the desired amount of said surface-active compound active in the presence of water hardness formers, wherein the amount of said alkali metal aluminate solution provided for the precipitation reaction with said alkali metal silicate solution is partially replaced to such an extent by the solution of an acid aluminum salt selected from the group consisting of aluminum sulfate, aluminum nitrate and aluminum chloride, added as a separate solution, that the total amount of alkali metal present in the precipitation reaction mixture over and above the amount of a mols of $Me_2O$ is converted into a water-soluble neutral salt by the acidity of said aluminum salt, by using x mols of $Al^{3+}$ ions in aqueous solution in order to obtain the precipitation product containing a mols of $Me_2O$ and b mols of $SiO_2$, per 1 mol of $Al_2O_3$, when using an alkali metal silicate solution containing c mols of $Me_2O$ per b mols of $SiO_2$ and an alkali metal aluminate solution containing d mols of $Me_2O$ per 1 mol of $Al_2O_3$, and reducing the given quantity of alkali metal aluminate by (x/2) mols, the value for x being other than 0 and obtained from the equation =

$$\frac{2(c + d - a)}{3 + d},$$

wherein said surface-active compound is present before the formation of the amorphous precipitation product, converting the reaction gel to an amorphous precipitation product by stirring, separating the mother liquor and recovering said cation-exchanging, water-insoluble, x-ray amorphous, alkali metal silicate free of excess alkali.

The aluminosilicate suspensions obtained may be concentrated by removal of part of the mother liquor if desired. For many purposes, it is advantageous to replace the mother liquor by water.

Finally, the aluminosilicates may be completely freed from the mother liquor and converted into dry powders by drying at temperatures of from 20° to 150° C., optionally under vacuum. These dried precipitation products still contain bound water which could only be removed completely by one hour's heating to 800° C., but such a heat treatment would also destroy the organic constituents. The values for the calcium binding capacities given in the Examples are based on this hypothetical completely dehydrated active substance (AS).

The ratio of aluminum salt to aluminate required can be calculated according to stoichiometric rules. If the product of the process is required to have the composition: a $Me_2O \cdot Al_2O_3 \cdot {}_b SiO_2$ and if the alkali metal silicate c $Me_2O \cdot b\ SiO_2$ and the alkali metal aluminate d $O \cdot b\ 2O \cdot 1\ Al_2O_3$ are used as starting materials, the quantity of acid aluminum salt is calculated as follows:

$$c\ Me_2O \cdot b\ SiO_2 + (1 - \frac{x}{2})\ d\ Me_2O \cdot 1\ Al_2O_3 + x\ (Al^{3+} \cdot 3\ X^-)$$

$$= a\ Me_2O \cdot 1\ Al_2O_3 \cdot b\ SiO_2 + \frac{3}{2} x Me_2O\ (\longrightarrow 3\ MeX).$$

The alkali metal balance is obtained from this equation as follows:

$$c + (1 - \frac{x}{2}) \cdot d = a + \frac{3}{2} x.$$

which, solved for x, provides the equation given above for calculating x.

If aluminum sulfate, for example, is used as the preferred acid aluminum salt, $(x/2)$ mol of aluminum sulfate must be used in the reaction.

The calculation is explained in the following numerical example for a sodium aluminosilicate which contains no excess alkali and has the composition:

$$0.7\ Na_2O \cdot Al_2O_3 \cdot 0.8\ SiO_2\ (a=0.7,\ b=0.8),$$

the surfactant being neglected for the sake of simplicity.

Starting materials used for the process:
(1) Sodium silicate having the composition:

$$0.3\ Na_2O \cdot 1.0\ SiO_2,$$

e.g., as a 35% aqueous solution, using $b=0.8$:

$$0 \cdot 0.24\ Na_2O \cdot 0.8\ SiO_2\ (c=0.24).$$

(2) Sodium aluminate having the composition:

$$1.2\ Na_2O \cdot Al_2O_3$$

e.g., as 27% aqueous solution $(d=1.2)$.
(3) Aluminum sulfate, $$Al_2(SO_4)_3 \cdot 0 \cdot 18\ H_2O,$$

e.g., as 28% aqueous solution.

Taking into account the composition of starting materials, the reaction equation for a precipitation mixture used for the preparation of 1 mol of the sodium aluminosilicate having the composition indicated above is then as follows:

$$0.24\ Na_2O \cdot 0.8\ SiO_2 + (1 - \frac{x}{2})\ 1.2\ Na_2O \cdot Al_2O_3 + x \cdot$$
$$\frac{1}{3}[Al_2(SO_4)_3] \longrightarrow$$
$$0.7\ Na_2O \cdot Al_2O_3 \cdot 0.8\ SiO_2 + \frac{3}{2}\ x\ NaSO_4$$

wherein $0.24\ Na_2O \cdot 0.8\ SiO_2$ is the quantity of sodium silicate corresponding to the above composition which provides the quantity of $SiO_2$ (0.8 mol) required for 1 mol of a sodium aluminosilicate having the desired composition, and wherein $x$ is the number of mols of aluminum ions ($=(x/2)$ mol of aluminum sulfate) required for converting the surplus $Na_2O$ present into sodium sulfate.

The following equation is obtained for the $Na_2O$ balance of this reaction mixture:

$$0.24\ mol + (1 - \frac{x}{2}) \cdot 1.2\ mol \longrightarrow 0.7\ mol + \frac{3}{2}\ x\ mol$$
$$0.24 + 1.2 - 0.6\ x = 0.7 + 1.5\ x$$
$$2.1\ x = 0.74$$
$$x = 0.352$$

Complete conversion of the surplus $Na_2O$, i.e., the quantity of $Na_2O$ above a mol, into sodium sulfate therefore requires $(x/2)=0.176$ mol of $Al_2(SO_4)_3$, so that the required quantity of sodium aluminate having the above composition is reduced to 0.824 mol. From this is obtained the following reaction equation for a reaction mixture used for the preparation of 1 mol of a sodium aluminosilicate having the desired composition:

$$0.24\ Na_2O \cdot 0.8\ SiO_2 + 0.824\ (1.2\ Na_2O \cdot Al_2O_3) + 0.176$$
$$Al_2(SO_4)_3 \rightarrow 0.7\ Na_2O \cdot 2O_3 \cdot 0.8\ SiO_2 + 3 \cdot 0.176$$
$$Na_2SO_4.$$

According to a special embodiment of the process of the invention, an aqueous solution of the tenside is mixed as separate solution with the silicate, aluminate and aluminum salt solutions. According to another variation of the process, the silicate solution containing the dissolved tenside is introduced into the reaction vessel and the aluminate solution is added first and mixed with it, and then the solution of acid aluminum salt is added. The same results are obtained if the aluminate solution and aluminum salt solution are both added at the same time to the tenside-containing silicate solution in the reaction vessel.

According to another preferred embodiment of the process, the silicate, aluminate and aluminum salt solutions are first mixed together, the silicate solution preferably being the one first introduced into the reaction vessel. The aqueous solution of tenside is then stirred into the precipitation mixture which is in the gel state, and the resulting reaction mixture is converted by further stirring into the amorphous precipitation product which has cation-exchanging properties. This variation of the process enables the gel initially formed to be discharged from the mixing apparatus and the tenside to be added immediately thereafter in a second vessel. Contamination of the reaction vessel with the tenside is thereby avoided so that the vessel can be used for the preparation of different products containing different types of tensides without first having to be cleaned. Another advantage of this embodiment is that the time of contact of the tensides with the strongly alkaline starting materials is shorter, so that damage is prevented, particularly to the highly sensitive cationic tensides.

The finished precipitation product may be separated from the mother liquor if required and thus freed from the neutral salt formed in the reaction.

The acid aluminum salt used is preferably aluminum sulfate. Aluminum nitrate and aluminum chloride can also be used but are less suitable.

The $Me_2O$ in the aluminosilicate formula is in most cases $Na_2O$ but the potassium compounds may be preferred in special cases. If desired, the aluminosilicates may be treated with organic bases taken from the group comprising primary, secondary and tertiary alkylamines and alkylolamines containing not more than 2 carbon atoms per alkyl group or 2 to 3 carbon atoms per alkylol group in order to replace the alkali metal cations in the aluminosilicates by the cations of these bases.

The procedure according to the invention provides an improved process for the formation of amorphous precipitation products having the desired composition and conversion of the excess alkali metal into a neutral salt. Separate subsequent neutralization, which is frequently found to impair the stability of the suspension formed in the precipitation reaction due to the formation of agllomerates is not necessary. The products obtained from the process are purely amorphous. Uneven formation of amorphous and crystalline aluminosilicates side by side, which may easily occur in the known process, is not observed in the process according to the invention. In the process of preparation carried out according to the invention, the reaction products are obtained as very small particles suspended in their mother liquor. They are virtually all below $30\mu$, with a maximum of the particle size distribution curve in the region of from 0.5 to 8μ.

Although the addition of acid aluminum salts for the preparation of aluminosilicates has been known for some time, it has hitherto always been carried out with an excess of alkali so that other products are also formed, i.e., crystalline aluminosilicates of the Faujasite type.

In the process according to this invention, on the other hand, the alkali metal is used in the stoichiometrically required quantity in the reaction mixture, thereby avoiding excess alkali in the x-ray amorphous end products.

The calcium binding capacity of the products is determined by the following method:

1 gm of the product under investigation [based on anhydrous active substance (AS)] which has been dried as described above is stirred for 15 minutes at 50° C. in one liter of a solution of 0.7865 gm of $CaCl_2 \cdot 2\ H_2O$ per liter of water (=30° dH) adjusted to pH=10. After removal of the aluminosilicate by filtration, the residual hardness H of the filtrate is determined. From this is calculated the calcium binding capacity in mg of CaO/gm AS according to the formula $(30-H) \cdot 10$. For short hand purposes, the above procedure is hereinafter referred to by the Calcium Binding Test Method.

The concentration of the suspensions obtained in the process of preparation is preferably in the range of from 2% to 50% by weight, especially from 5% to 35% by weight, of tenside-containing aluminosilicate. These concentrations refer to the products which have been dried for three hours at 80° C. and 100 Torr but still contain from 8% to 45% by weight of bound water. These drying conditions were chosen because they result in pourable powders which have a dry feel without impairing the calcium binding capacity.

The process according to the invention results in higher conversions of silicate and aluminate than those obtained with reaction mixtures containing a high concentration of alkali, in which part of the silicate and of the aluminate is liable to remain dissolved in the mother liquor. The process according to this invention has for the first time made it possible to prepare, in reasonably high yields, products which have an exceptionally low or exceptionally high concentration of silica, i.e., about 0.8 or about 6.0 mol of $SiO_2$, respectively, per mol of $Al_2O_3$.

In the precipitation process, the tensides are built into the x-ray amorphous aluminosilicate which is in the process of forming, and they are released from this aluminosilicate more or less slowly, depending on the nature of the tenside, when the aluminosilicate is introduced into water which is free from tensides. It may, therefore, be advantageous to use aqueous tenside solutions of the incorporated tenside for washing out the mother liquors to purify the precipitated crude product.

Hardness resistant tensides within the meaning of this invention may be anionic, cationic or zwitterionic surface-active compounds, as described in some detail in the above-mentioned German DOS No. 2,439,572.

Nonionic surface-active compounds may also be used in the process according to the invention in addition to the hardness-resistant anionic, cationic and zwitterionic surface-active compounds described in more detail in German DOS No. 2,439,572.

The nonionic surface-active compounds or tensides are addition products of from 1 to 40 mols, preferably from 2 to 20 mols, of ethylene oxide to 1 mol of an aliphatic compound having a replaceable hydrogen atom and containing substantially 10 to 20 carbon atoms, taken from the group comprising alcohols, carboxylic acids, fatty amines, carboxylic acid amides or alkanesulfonamides; as well as alkylphenols containing substantially 6 to 14 carbon atoms in the alkyl. The addition products of from 8 to 20 mols of ethylene oxide to primary alcohols, such as coconut oil fatty alcohols, tallow fatty alcohols, oleyl alcohol or oxo alcohols, or to secondary alkanols having from 8 to 18, preferably 12 to 18, carbon atoms or to monoalkyl or dialkylphenols having from 6 to 14 carbon atoms in the alkyl groups are particularly important. In addition to these water-soluble nonionics, however, water-insoluble or not completely water-soluble polyglycol ethers having from 2 to 7 ethylene glycol ether groups in the molecule are also of interest, particularly if they are used together with water-soluble nonionic or anionic tensides.

Water-soluble addition products of ethylene oxide with polypropylene glycol, with alkylenediamine polypropylene glycol or with alkylpolypropylene glycols having from 1 to 10 carbon atoms in the alkyl chain, which addition products contain from 20 to 250 ethylene glycol ether groups and from 10 to 100 propylene glycol ether groups, may also be used as nonionic tensides. In these compounds, the polypropylene glycol chain functions as the hydrophobic group. Nonionic tensides of the type of amine oxides or sulfoxides may also be used, for example, the compounds, N-coconut akyl-N,N-dimethyl aminoxide, N-hexadecyl-N,N-bis-(2,3-dihydroxypropyl)-aminoxide and N-tallow alkyl-N,N-dihydroxyethyl aminoxide.

The tensides may be bound to the surface of the aluminosilicate particles but they may also be incorporated in the aluminosilicates. In most cases, they are both adsorbed on the surface and incorporated within the aluminosilicates.

It has been found that tensides which have large and bulky hydrophobic groups (e.g., those with branched chains or ring systems) are more firmly anchored in the aluminosilicates than those with straight-chain aliphatic groups. This may be seen by the fact that when suspended in water, the last-mentioned tensides are more easily dissolved out of the aluminosilicates than the former.

Those aluminosilicates which contain anionic, nonionic or zwitterionic surface-active compounds are suitable for use as additives to washing and cleaning liquors because of their property of releasing their surfactants in aqueous systems. Those which contain cationic surface-active compounds are distinguished by their remarkable capacity for adsorbing dissolved dyes or dispersed pigments in aqueous suspension and may, therefore, be used as adsorbents for such substances.

The following examples are illustrative of the practice of the invention without being limitative thereof.

EXAMPLES

In the following Examples the method according to the invention using different types of tensides and, for comparison, the method known in the art for preparing sodium aluminosilicates containing bound cationic tensides, are described.

EXAMPLE 1

80 gm of a 25% aqueous solution of hexadecyltrimethylammonium chloride and 140 gm of a 35% aqueous solution of sodium silicate ($Na_2O:SiO_2=1:3.4$), dissolved in 550 ml of deionized water were introduced into a vessel having a capacity of 1.5 liters. 46 gm of sodium aluminate (38% Na$_2$O, 52% Al$_2$O$_3$) dissolved in 150 ml of water were mixed with the above-mentioned solutions by means of a high speed stirrer and 39 gm of Al(SO$_4$)$_3$. 18 H$_2$O dissolved in 100 gm of water were added immediately thereafter.

After stirring had been continued for three hours, an aliquot portion of the resulting suspension was removed to isolate and examine the aluminosilicate, and the mother liquor was removed from the precipitation product by vacuum suction filtration.

After it had been washed four times with 50 ml portions of deionized water, the filter residue was dried for three hours at 100 Torr and 80° C. and analyzed. All analytical data for the remaining examples are also based on products which had been dried under these conditions.

| | |
|---|---|
| Composition of the precipitation product: | 0.6 Na$_2$O . 1 Al$_2$O$_3$ . 2.0 SiO$_2$ . 4.8 H$_2$O 17.0% hexadecyltrimethyl-ammonium chloride. |
| Calcium binding capacity (mg CaO/gm AS): | 130 |

EXAMPLE 2

For comparison, a product was prepared under the same conditions as in Example 1, but without addition of an acid aluminum salt. Instead of 46 gm of sodium aluminate, 55% of sodium aluminate of the same composition were used.

| | |
|---|---|
| Composition of the precipitation product: | 0.9 Na$_2$O. 1 Al$_2$O$_3$ . 2.4 SiO$_2$ . 4.4 H$_2$O 17.0% hexadecyltrimethylammonium chloride. |
| Calcium binding capacity (mg CaO/gm AS): | 120. |

The results of the test for storage stability of product 1 according to the invention prepared as described in Example 1, for comparison, the results obtained with the known product 2 described in Example 2, which contains excess alkali, are shown in the following Table.

Storage stability at 25° C. and 65% relative humidity.

TABLE

| | Storage Time (days) | | | | | | |
|---|---|---|---|---|---|---|---|
| | 2 | 4 | 7 | 14 | 21 | 28 | 35 |
| Product 1 | | | | | | | |
| Appearance | ← | ← | white | → | → | → | → |
| Odor | ← | ← | odorless | → | → | → | → |
| Product 2 | | | | | | | |
| Appearance | white | slightly yellowish | yellow | → | → | → | → |
| Odor | none | slight | strong | → | → | → | → |

EXAMPLE 3

80 gm of a 25% aqueous solution of hexadecyltrimethylammonium chloride and 109 gm of a 35% aqueous solution of sodium silicate (Na$_2$O:SiO$_2$=1:3.4) dissolved in 341 gm of deionized water were introduced into a reaction vessel as described in Example 1. 57 gm of sodium aluminate (38% Na$_2$O, 53% Al$_2$O$_3$) dissolved in 200 gm of water followed by 61.0 gm of Al$_2$(SO$_4$)$_3$·18 H$_2$O dissolved in 160 gm of water were added thereto.

The process was then continued as described in Example 1.

| | |
|---|---|
| Composition of the precipitation product: | 0.7 Na$_2$O . 1 Al$_2$O$_3$ . 1.2 SiO$_2$ 8.0 H$_2$O 17.8% hexadecyltrimethyl ammonium chloride. |
| Calcium binding capacity (mg CaO/gm AS): | 135. |

EXAMPLE 4

80 gm of a 25% aqueous solution of hexadecyltrimethylammonium chloride and 243 gm of a 35% aqueous solution of sodium silicate (Na$_2$O:SiO$_2$=1:3.4) dissolved in 340 gm of deionized water were introduced into the reaction vessel, as described in Example 1. 23.0 gm of sodium aluminate (38% Na$_2$O, 52% Al$_2$O$_3$) dissolved in 122 gm of water and 42.2 gm of Al$_2$(SO$_4$)$_3$·18 H$_2$O dissolved in 160 gm of water were both added thereto at the same time under conditions of vigorous mixing.

The process was then continued as described in Example 1.

| | |
|---|---|
| Composition of the precipitation product: | 1.5 Na$_2$O . 1 Al$_2$O$_3$ . 5.8 SiO$_2$ . 14 H$_2$O 18.5% hexadecyltrimethylammonium chloride. |
| Calcium binding capacity (mg CaO/gm AS): | 105. |

EXAMPLE 5

142.9 gm of a 35% aqueous solution of sodium silicate (Na$_2$O:SiO$_2$=1:3.4) dissolved in 507.4 gm of deionized water were introduced into a reaction vessel having a capacity of 1.5 liters and 48.3 gm of sodium aluminate (38% Na$_2$O, 52% Al$_2$O$_3$) dissolved in 150 gm of water were added and the components were thoroughly mixed. 42.4 gm of Al$_2$(SO$_4$)$_3$·H$_2$O dissolved in 100 gm of water were then stirred into the mixture and after ten minutes' stirring, 8 gm of a 50% paste of sodium dodecylbenzene sulfonate were added. After a further 160 minutes' stirring, an aliquot portion of the resulting suspension was removed and treated as described in Example 1.

| | |
|---|---|
| Composition of the precipitation product: | 1.0 Na$_2$O . 1 Al$_2$O$_3$ . 2.1 SiO$_2$ . 4.1 H$_2$O 2.1% sodium dodecylbenzene sulfonate. |
| Calcium binding capacity (mg. CaO/gm AS): | 128. |

EXAMPLE 6

48.3 gm of sodium aluminate (38% Na$_2$O, 52% Al$_2$O$_3$) dissolved in 150 gm of deionized water were introduced into a reaction vessel having a capacity of 1.5 liters. 142.9 gm of a 35% aqueous solution of sodium silicate (Na$_2$O:SiO$_2$=1:3.4) dissolved in 510 gm of deionized water were added with vigorous stirrings. 42.4 gm of Al$_2$(SO$_4$)$_3$·18 H$_2$O dissolved in 100 gm of deionized water were added with further stirring. 5.0 gm of a condensation product of 1 mol of tallow fatty alcohol and 5 mols of ethylene oxide (EO) were added immediately after addition of the aluminum sulfate. After three hours' continued stirring, the process was continued as described in Example 1.

| | |
|---|---|
| Composition of the precipitation product: | 1.0 Na$_2$O . 1 Al$_2$O$_3$ . 2.3 SiO$_2$ . 7.1 H$_2$O |
| | 3.4% tallow fatty alcohol + 5 EO. |
| Calcium binding capacity (mg CaO/gm AS): | 135. |

EXAMPLE 7

142.9 gm of a 35% aqueous silicate (Na$_2$O:SiO$_2$=1:3.4) dissolved in 500 gm of deionized water were introduced into a 1.5 liter stirrer vessel and 43.8 gm of sodium aluminate (38% Na$_2$O, 52% Al$_2$O$_3$) dissolved in 150 gm of deionized water were added with vigorous stirring. 42.4 gm of Al$_2$(SO$_4$)$_3$·18 H$_2$O dissolved in 100 gm of deionized water were then added, immediately followed by 16.6 gm of a 30% aqueous solution of N-coconut alkyl-N,N-dimethylammonium acetate.

The process was then continued as described in Example 1.

| | |
|---|---|
| Composition of the precipitation product: | 1.0 Na$_2$O . 1 Al$_2$O$_3$ . 2.1 SiO$_2$ . 4.1 H$_2$O |
| | 2.5% N-coconut-alkyl-N,N-dimethyl ammonium acetate. |
| Calcium binding capacity (mg CaO/gm AS): | 132. |

The products according to the invention prepared as described in Examples 3 to 7 were comparable in their properties to the product described in Example 1.

The preceding specific embodiments are illustrative of the practice of the invention. It is to be understood, however, that other expedients disclosed herein or known to those skilled in the art, may be employed without departing from the spirit of the invention or the scope of the appended claims.

We claim:

1. A process for the production of a cation-exchanging water-insoluble, x-ray amorphous alkali metal aluminosilicate free of excess alkali, containing at least 3 mols of bound water for every mol of Al$_2$O$_3$ and from 0.01% to 50% by weight, based on the anhydrous weight, of a surface-active compound active in the presence of water hardness formers selected from the group consisting of anionic surface-active compounds, cationic surface-active compounds, nonionic surface-active compounds, and zwitterionic surface-active compounds, and having for every mol of Al$_2$O$_3$, a mols of Me$_2$O, where Me is an alkali metal, and b mols of SiO$_2$, wherein a represents a value of from 0.7 to 1.5 and b represents a value of from 0.8 to 6, said aluminosilicates having a calcium sequestering power of from 50 to 200 mg CaO/gm of anhydrous active substance when measured at 50° C. by the Calcium Binding Power Test Method set out in the specification and a particle size of less than 30μ, which comprises the steps of mixing an aqueous alkali metal silicate solution and an aqueous alkali metal aluminate solution in the presence of the desired amount of said surface-active compound active in the presence of water hardness formers, wherein the amount of said alkali metal aluminate solution provided for the precipitation reaction with said alkali metal silicate solution is partially replaced to such an extent by the solution of an acid aluminum salt selected from the group consisting of aluminum sulfate, aluminum nitrate and aluminum chloride, added as a separate solution, that the total amount of alkali metal present in the precipitation reaction mixture over and above the amount of a mols of Me$_2$O is converted into a water-soluble neutral salt by the acidity of said aluminum salt, by using x mols of Al$^{3+}$ ions in aqueous solution in order to obtain the precipitation product containing a mols of Me$_2$O and b mols of SiO$_2$, per 1 mol of Al$_2$O$_3$, when using an alkali metal silicate solution containing c mols of Me$_2$O per b mols of SiO$_2$ and an alkali metal aluminate solution containing d mols of Me$_2$O per 1 mol of Al$_2$O$_3$, and reducing the given quantity of alkali metal aluminate by (x/2) mols, the value for x being other than 0 and obtained from the equation =

$$\frac{2(c+d-a)}{3+d},$$

wherein said surface-active compound is present before the formation of the amorphous precipitation product, converting the reaction gel to an amorphous precipitation product by stirring, separating the mother liquor and recovering said cation-exchanging, water-insoluble, x-ray amorphous, alkali metal silicate free of excess alkali.

2. The process of claim 1 wherein said surface-active compound is present in amount of from 0.1% to 35% by weight, based on the anhydrous weight.

3. The process of claim 1 wherein said cation-exchanging, water-insoluble, x-ray amorphous, alkali metal aluminosilicate free of excess alkali is recovered as a dry-appearing product containing from 8% to 45% by weight of bound water.

4. The process of claim 1 wherein said cation-exchanging, water-insoluble, x-ray amorphous, alkali metal aluminosilicate free of excess alkali is recovered as an aqueous suspension containing from 2% to 50% by weight of said aluminosilicate.

5. The process of claim 1 wherein said cation-exchanging, water-insoluble, x-ray amorphous, alkali metal aluminosilicate free of excess alkali is recovered as an aqueous suspension containing from 5% to 35% by weight of said aluminosilicate.

6. The process of claim 1, wherein said alkali metal silicate solution and said surface-active compound are first mixed and said alkali metal aluminate solution is then added to the aforesaid components and mixed with them, and said aluminum salt solution is added and mixed subsequently.

7. The process of claim 1, wherein said alkali metal silicate solution and said surface-active compound are first mixed and said alkali metal aluminate solution and said aluminum salt solution are both added thereto at the same time and mixed.

8. The process of claim 1, wherein said alkali metal aluminate solution and said aluminum salt solution are added to and mixed with said alkali metal silicate solution, and thereafter an aqueous solution of said surface-active compound is added to said reaction gel before said conversion to an amorphous precipitation product.

9. The process of claim 1 wherein said acid aluminum salt is aluminum sulfate.

10. The process of claim 1 wherein said surface-active compound active in the presence of water hardness formers is an anionic surface-active compound.

11. The process of claim 10 wherein said anionic surface-active compound is selected from the group consisting of sulfonates, sulfates and carboxylates.

12. The process of claim 1 wherein said surface-active compound active in the presence of water hardness formers is a cationic surface-active compound.

13. The process of claim 1 wherein said surface-active compound active in the presence of water hardness formers is a nonionic surface-active compound.

14. The process of claim 1 wherein said surface-active compound active in the presence of water hardness formers is a zwitterionic surface-active compound.

15. The process of claim 1 wherein said separation of said mother liquor is not complete.

16. The process of claim 1 wherein said aluminosilicate is washed after separating said mother liquor.

17. The process of claim 16 wherein said washing step is conducted with an aqueous solution of said surface-active compound.

* * * * *